United States Patent
Zhang et al.

(10) Patent No.: US 11,091,728 B2
(45) Date of Patent: Aug. 17, 2021

(54) FRUIT WINE PRODUCT BENEFICIAL TO HEALTH OF CARDIOVASCULAR SYSTEM AND PREPARATION METHOD THEREOF

(71) Applicant: Jiangnan University, Wuxi (CN)

(72) Inventors: Lianfu Zhang, Wuxi (CN); Shuo Li, Wuxi (CN); Jiahao Yu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 16/259,945

(22) Filed: Jan. 28, 2019

(65) Prior Publication Data
US 2019/0203163 A1 Jul. 4, 2019

Related U.S. Application Data

(63) Continuation of application No. PCT/CN2017/119416, filed on Dec. 28, 2017.

(51) Int. Cl.
*C12G 1/14* (2019.01)
*C12G 3/055* (2019.01)
(Continued)

(52) U.S. Cl.
CPC ............ *C12G 1/14* (2019.02); *A23L 2/02* (2013.01); *A23L 2/52* (2013.01); *C12G 3/055* (2019.02); *C12G 2200/21* (2013.01)

(58) Field of Classification Search
CPC .. A23L 2/52; A23L 2/02; C12G 3/055; C12G 1/14
(Continued)

(56) References Cited

U.S. PATENT DOCUMENTS 8,202,561 B2 * 6/2012 Livaich ............... A23L 2/02
426/592
2001/0002269 A1 * 5/2001 Zhao .................. A23F 5/44
426/112
(Continued)

FOREIGN PATENT DOCUMENTS

CN 1282787 A 2/2001
CN 1635093 A 7/2005
(Continued)

*Primary Examiner* — Vera Stulii
(74) *Attorney, Agent, or Firm* — IPro, PLLC

(57) ABSTRACT

The present invention discloses a fruit wine product beneficial to the health of a cardiovascular system and a preparation method thereof, and belongs to the technical field of traditional food functionalization. The present invention uses the fruit wine as a base material; by leaching black garlic and baked onion and/or adding tomato clear juice powder and concentrated onion juice, taking advantage of the synergistic effect of alcohol with promoted Amadori compounds, flavonoids and/or proanthocyanidins extraction from the black garlic, baked onion, tomato clear juice powder and concentrated onion juice, to prepare fruit wine product containing 5-15 g/100 mL alcohol, 20-100 mg/100 mL Amadori Compound, 30-50 mg/100 mL total flavonoids and/or 100-250 mg/100 mL proanthocyanidins, and such fruit wine product can more effectively reduce the blood viscosity of consumers and achieve an beneficial effect on cardiovascular health.

10 Claims, 2 Drawing Sheets

(51) Int. Cl.
*A23L 2/52* (2006.01)
*A23L 2/02* (2006.01)

(58) Field of Classification Search
USPC .................................................. 426/590, 592
See application file for complete search history.

(56) References Cited

U.S. PATENT DOCUMENTS

| | | | |
|---|---|---|---|
| 2009/0110789 A1* | 4/2009 | Mower | A23L 2/52 426/330.5 |
| 2010/0119667 A1* | 5/2010 | Livaich | C12G 3/06 426/131 |
| 2012/0082771 A1* | 4/2012 | Livaich | C12G 3/06 426/324 |
| 2014/0234488 A1* | 8/2014 | Chang | A23L 2/38 426/62 |

FOREIGN PATENT DOCUMENTS

| | | | |
|---|---|---|---|
| CN | 101085970 | * | 12/2007 |
| CN | 101085970 A | | 12/2007 |
| CN | 102703293 A | | 10/2012 |
| CN | 102994345 | * | 3/2013 |
| CN | 104087462 | * | 10/2014 |
| CN | 104531484 | * | 4/2015 |
| CN | 104531484 A | | 4/2015 |

* cited by examiner

FRUIT WINE PRODUCT BENEFICIAL TO HEALTH OF CARDIOVASCULAR SYSTEM AND PREPARATION METHOD THEREOF

TECHNICAL FIELD

The present invention relates to a fruit wine product beneficial to the health of a cardiovascular system and a preparation method thereof, and belongs to the technical field of traditional food functionalization.

BACKGROUND

Fruit wine is based on the sugar of fruit itself, and produced when the sugar is fermented by yeast to produce alcohol. The alcohol content is generally 5-24 g/100 mL. The raw materials used include grapes, blueberries, chokecherries, bayberries, Chinese wolfberries and the like. Since the fruit wine contains ingredients such as anthocyanins, resveratrol and flavonoids derived from the fruit, it is generally considered that the fruit wine has physiological functions such as softening blood vessels. However, due to the limited content of the above functional ingredients in fruit wine, it is infactually not effective to exert such beneficial effects on cardiovascular health.

At the same time, fruits and vegetables containing higher concentrations of reducing sugars and amino acids, such as tomatoes, garlic, onions, etc., can form Amadori Compounds in a system under suitable conditions during thermal processing. Existing studies have shown that Amadori Compounds can reduce the blood viscosity and blood pressure of subjects to achieve a beneficial effect on cardiovascular health by chelating copper ions, inhibiting angiotensin-converting enzyme (ACE) from hydrolyzing angiotensin I to form angiotensin II with blood pressure increasing activity, promoting NO formation and doing other things.

SUMMARY

The present invention aims to provide a fruit wine product beneficial to the health of a cardiovascular system and a preparation method thereof. By adding specific fruit and vegetable hot-processed products to suitable fruit wine, and taking into account the interaction relationship between the alcohol content in the fruit wine and the content and dissolution efficiency of Amadori Compounds in the fruit and vegetable hot-processed products, the content of total flavonoids and the anthocyanidin in fruits and vegetables, the beneficial effect on cardiovascular health is enhanced without affecting the taste and flavor, storage stability and bright color of the fruit wine.

The method comprises: using fruit wine with the alcohol content of 12-15 g/100 mL as a base material, directly leaching black garlic and baked onion in the base fruit wine to dissolve Amadori Compounds, then sequentially mixing with tomato clear juice powder and/or concentrated onion juice to obtain fruit wine concentrate, and finally mixing with fruit wine base with a lower alcohol concentration, thereby enabling the final product to contain 5-15 g/100 mL alcohol, 20-100 mg/100 mL Amadori Compounds, 30-50 mg/100 mL total flavonoids and/or 100-250 mg/100 mL proanthocyanidins.

The base fruit wine includes, but is not limited to grape wine, blueberry wine, chokeberry wine, bayberry wine and Chinese wolfberry wine, and also can be a mixture of different fruit wine, and the alcohol concentration shall reach 12-15 g/100 mL. Grape wine, blueberry wine, chokeberry wine, bayberry wine, Chinese wolfberry wine or a mixture thereof containing 30-50 mg/100 mL total flavonoids and/or 100-250 mg/100 mL anthocyanidins is preferred.

The black garlic is a garlic product prepared by allowing fresh garlic to naturally react at a temperature of 45-90° C. and a relative humidity of 50-95% for 30-90 days and with an Amadori Compounds content of 10 g/kg or higher.

The baked onion is dried onion prepared by baking fresh onion at 180-300° C. for 10-30 min and with an Amadori Compounds content of 8 g/kg or higher in the product.

The concentrated onion juice contains a total flavonoid content of 1.5 g/kg or higher and an Amadori Compounds content of 10 g/kg or higher.

The tomato clear juice powder is prepared by performing crushing, pectin enzymatic hydrolysis, filtration, moderate heat treatment (concentration) and drying on tomatoes, and obtained tomato clear juice powder with Amadori Compounds content of 10 g/kg or higher.

In one embodiment of the present invention, the fruit wine with the alcohol concentration of 12-15 g/100 mL is selected as the base material, the black garlic is added according to the proportion of 5-10 g/100 mL, the baked onion is added according to the proportion of 3-10 g/100 mL, treatment is performed for 3 minutes by a tissue masher, the mixture is stood in an environment of 4-10° C. for 5-8 hours, the residue is filtered and removed, then the tomato clear juice powder is added according to the proportion of 1-5 g/100 mL and/or the onion juice concentrate is added according to the proportion of 1-5 mL/100 mL to obtain the fruit wine concentrate, and finally, adjustment is performed with fruit wine with a proper alcohol content to make the product contain 20-100 mg/100 mL Amadori Compounds (represented by the sum of eight components of Fru-Arg, Fru-His, Fru-Glu, Fru-Ala, Fru-Phe, Fru-Leu, Fru-Met and FruVal), and contain 30-50 mg/100 mL total flavonoids and/or 100-250 mg/100 mL proanthocyanidins.

The specific operations are as follows:

1) selection of raw materials;

2) raw material treatment: the baked onion is preliminarily pulverized and then further pulverized into 40-60 mesh granules, and the black garlic is preliminarily pulverized for later use;

3) preparation: selecting the base fruit wine with the alcohol content of 12-15 g/100 mL and the anthocyanidin content of 100-250 mg/100 mL, adding the pulverized black garlic according to the proportion of 5-10 g/100 mL, adding the baked onion powder according to the proportion of 3-10 g/100 mL, performing treatment for 3 minutes by a 1000 rpm tissue masher, allowing the mixture to stand in an environment of 4-10° C. for 5-8 hours, after the Amadori Compounds in the black garlic and the baked onion is fully leached out, filtering and removing the residue, then adding the tomato clear juice powder according to the proportion of 1-5 g/100 mL and/or the onion juice concentrate according to the proportion of 1-5 mL/100 mL to obtain the fruit wine concentrate, and finally, performing adjustment with fruit wine with a proper alcohol concentration to make the product contain 20-100 mg/100 mL Amadori Compounds, and contain 30-50 mg/100 mL total flavonoids and/or 100-250 mg/100 mL proanthocyanidins.

4) subsequent treatment of the product: after the addition, adjusting the alcohol content of the fruit wine to 5-15 g/100 mL, and then removing insoluble ingredients by fine filtration and then performing filling.

Beneficial Effects of the Present Invention

The fruit wine with the alcohol content of 12-15 g/100 mL is selected as a base material, the fruit wine with a higher concentration of alcohol content is used to leach the black garlic and the baked onion to fully extract the Amadori Compounds therein, then the fruit wine concentrate is obtained by sequentially adding the tomato clear juice powder and the concentrated onion juice, and finally the concentration of Amadori Compounds, anthocyanidins and total flavonoids in the product is adjusted by the fruit wine with a proper alcohol concentration; the use of the fruit wine with a higher alcohol concentration can fully extract the Amadori Compounds in the black garlic and the baked onion, avoid a repeated operation after extraction of an aqueous alcohol solution, and reduce the risk of bad odor of the fruit wine concentrate; after that, sequential addition of the tomato clear juice powder and the concentrated onion juice to the fruit wine concentrate can ensure the concentration of the Amadori Compounds in the product without resulting in that the color of the wine is black because the concentration of the added black garlic and the added baked onion is too high.

The fruit wine product provided by the present invention is prepared by conventional physical processing from common food-grade raw materials, is a common food, and avoids the defect that the product cannot be consumed as a common food when the Amadori Compounds obtained by extraction of the aqueous alcohol solution is added to grape wine. At the same time, by use of the characteristic of a synergistical effect of the alcohol and the Amadori Compounds, the flavonoid compound and/or the proanthocyanidins, the product contains 5-15 g/100 mL alcohol, 20-100 mg/100 mL Amadori Compounds, 30-50 mg/100 mL total flavonoids and/or 100-250 mg/100 mL proanthocyanidins. The above active ingredients have a synergistic effect, and can more effectively reduce the blood viscosity of consumers and achieve the beneficial effect on cardiovascular health.

DETAILED DESCRIPTION

Figure 1:
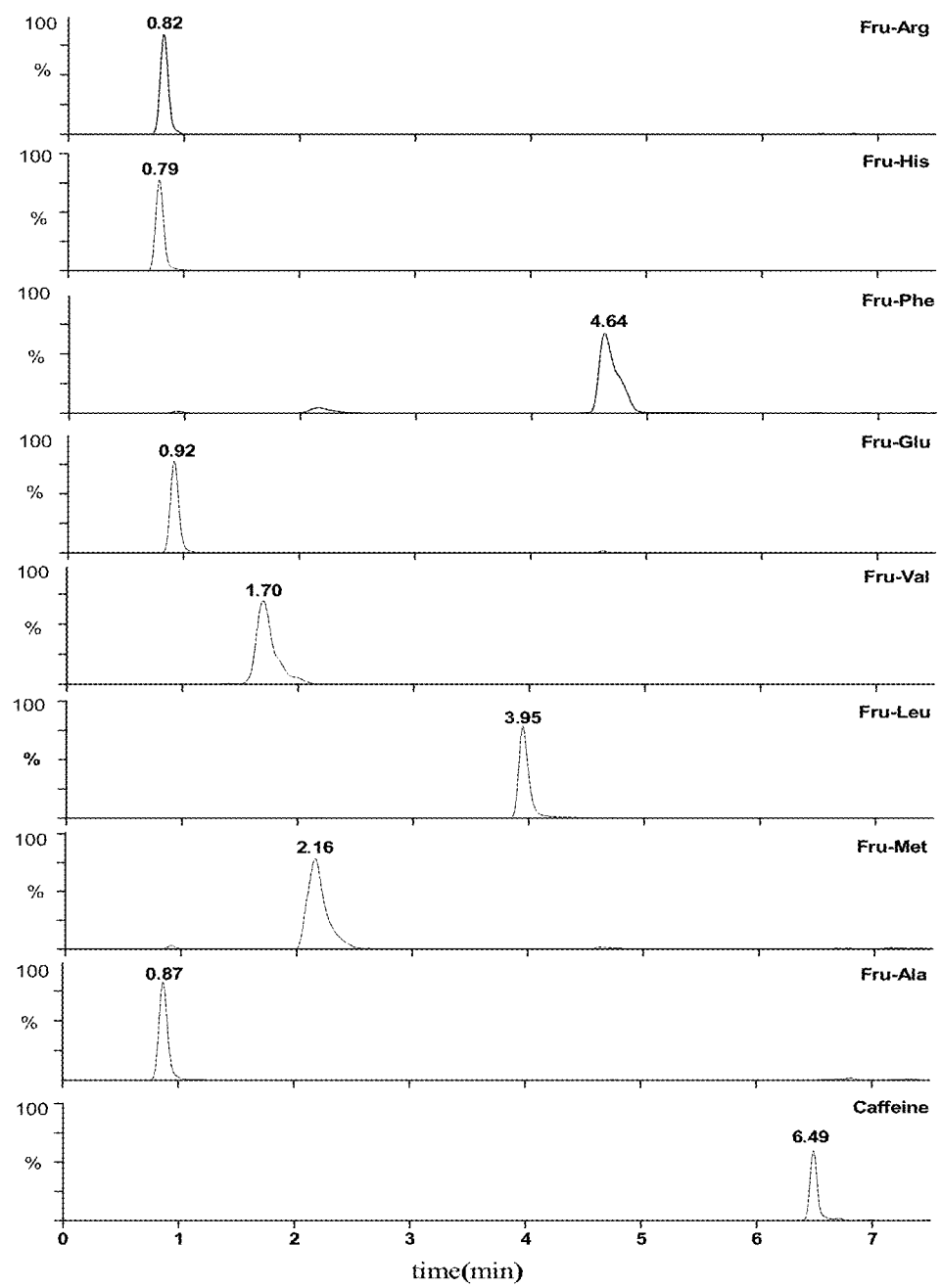
FIG. 1: Mass spectra of Fru-Val, Fru-Leu, Fru-Phe, Fru-Ala, Fru-Glu, Fru-His, Fru-Arg, Fru-Met and internal standard (caffeine).
Figure 2:
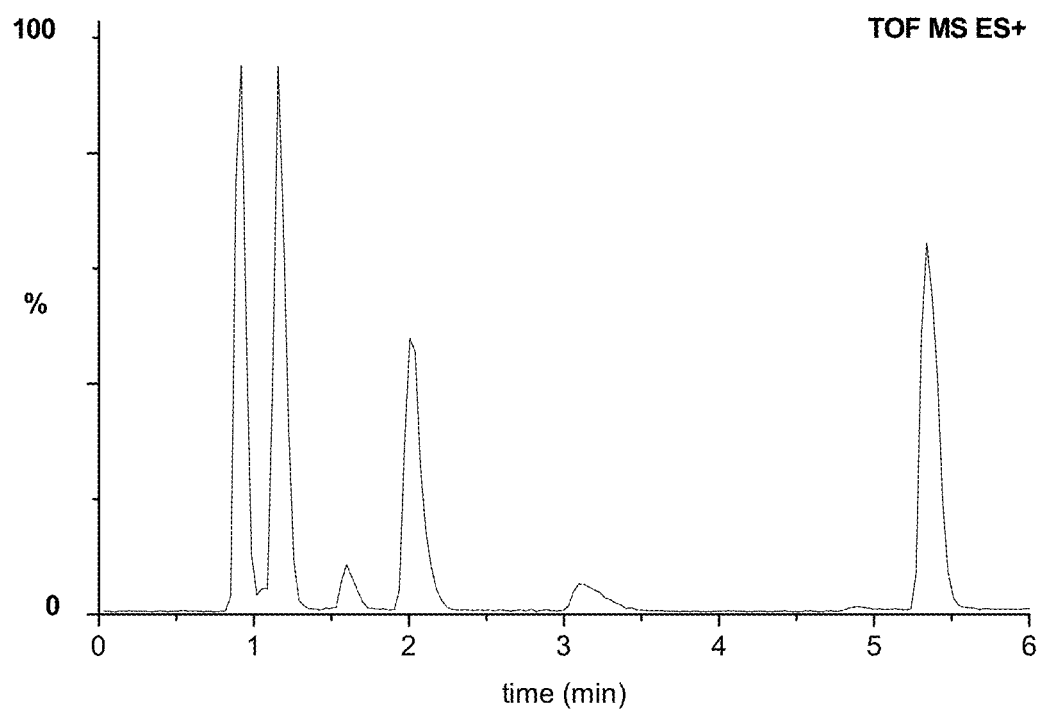
FIG. 2: Liquid phase diagram of a detected Amadori Compounds in samples of example 1.

Determination of the content of Amadori Compounds, total flavonoids and anthocyanins in the samples:

Sample treatment: a proper amount of a sample of a fruit wine product beneficial to the health of a cardiovascular system disclosed by the present invention is weighed, grinding and pulverizing are performed, anhydrous methanol is added according to a ratio of 1:10, extracting at room temperature is performed for about 4 hours, filtering is performed after extraction, separation is performed to obtain a filtrate, the methanol is removed by rotary evaporation at 60° C., and ultrapure water is added to prepare a solution of an appropriate concentration for testing.

Determination of Amadori Compounds content: determination is performed by ultra-high pressure liquid chromatography-mass spectrometry (UPLC-Q-TOF-MS) with the sum of major Amadori Compound components including Fru-Arg, Fru-His, Fru-Glu, Fru-Ala, Fru-Phe, Fru-Leu, Fru-Met and FruVal as an indicator;

Instrument: UPLC-Q-TOF-MS Ultra Performance Liquid Chromatography-Quadrupole-Time-of-Flight Tandem Mass Spectrometer (Waters, U.S.A.); chromatographic column: CORTECS C18+(2.7 μm, 2.1*150 mm);

Liquid phase conditions: phase A: acetonitrile; phase B: 0.1% formic acid water; flow rate: 0.3 mL/min; column temperature: 45° C.; gradient elution procedure: an initial condition is 100% phase B, phase B changes from 100% to 90% in 1 min to 5 min, phase B changes from 90% to 50% in 5 min to 6 min, phase B changes from 50% to 100% in 6 min to 7 min, and after 7 min, phase B remains 100% for a running time of 10 min.

Determination of total flavonoids content: determination is performed by $NaNO_2$-$Al(NO_3)_3$ color development and 510 nm colorimetry, and rutin is used as a standard.

Determination of anthocyanidin content: Announcement No. 2166 NY/T2640-2014 Determination of Anthocyanidins in Plant-derived Foods by Ministry of Agriculture of the People's Republic of China is adopted by high performance liquid chromatography.

Sensory Evaluation Method:

Performing double blind sampling. 50 mL of the sample to be evaluated is measured, the sample is placed in a 100 mL white beaker, the beaker is gently rotated, the color is observed by an incandescent lamp and whether the wine is clear and transparent or not is checked; the position of the beaker mouth is held by the right hand, the air is gently moved toward the evaluator by the left hand to feel the aroma (smell) of the wine body and the aroma is evaluated; 2-3 mL of the sample is sipped, the wine is whirled in the mouth for 10-30 seconds, the taste of the wine is felt and evaluated, then scoring is performed according to color, clarity, smell and taste, and the score sheet is filled out. The total score of four items of each product is 20 points, and 16 points or more is qualified.

TABLE 1

| | Product evaluation criteria | | | | |
| --- | --- | --- | --- | --- | --- |
| Items | 5 points | 4 points | 3 points | 2 points | 1 point |
| Color | Grape wine red | Grape wine red, slightly darker | Red, but obviously darker than grape wine | Dark brown red, slightly black | Black red |
| Clarity | Clear and transparent, no fine suspended matter | Clear, with a little suspended matter which does not affect the appearance | Relatively clear, with visible suspended matter under light | With obvious suspended matter under the light | With visible suspended matter under natural conditions |

TABLE 1-continued

Product evaluation criteria

| Items | 5 points | 4 points | 3 points | 2 points | 1 point |
|---|---|---|---|---|---|
| Smell | Grape wine aroma, with light onion and garlic smell | Grape wine aroma, with obvious onion and garlic smell | Grape wine aroma, with heavy onion and garlic smell, acceptable | Obvious onion and garlic smell, still acceptable | Heavy onion and garlic smell, unacceptable |
| Taste | Grape wine taste, with slight onion and garlic fragrance | Grape wine taste, with relatively obvious onion and garlic taste | Grape wine taste, relatively heavy onion and garlic taste, acceptable | Obvious onion and garlic taste, still acceptable | Onion and garlic taste, unacceptable |

Example 1

1,000 mL of dry red grape wine is taken as a base material (of which alcohol content is 13.5 g/100 mL and anthocyanidin content is 112 mg/100 mL), 50 g of black garlic cut into 3 mm slices and 100 g of baked onion powder pulverized to 60 meshes are added, treatment is performed for 3 minutes by a 1000 rpm tissue masher, the mixture is stood in an environment of 4° C. for 8 hours, the residue is filtered and removed, 30 g of tomato clear juice powder is added to the clear liquid to obtain fruit wine concentrate, the fruit wine concentrate is adjusted with grape wine with an alcohol content lower than 10 g/100 ml until the fruit wine concentrate contains 60 mg/100 mL Amadori Compounds, 50 mg/100 mL total flavonoids and/or 100 mg/100 mL proanthocyanidins, the alcohol content is adjusted to 12.5 g/100 mL, and fine filtration and filling are performed to obtain a finished product. After storage for 24 months at room temperature, the retention rate of the Amadori Compounds, the total flavonoids and the anthocyanins in the product is 90% or higher.

Sensory evaluation results: color is 5 points, clarity is 4 points, smell is 3 points, taste is 5 points, and total score is 17 points.

Example 2

1,000 mL of chokeberry wine is taken as a base material (of which alcohol content is 11.5 g/100 mL and anthocyanidin content is 249 mg/100 mL), black garlic cut into 3 mm slices is added, treatment is performed for 3 minutes by a 1000 rpm tissue masher, the mixture is stood in an environment of 4° C. for 8 hours, the residue is filtered and removed, then 50 g of tomato clear juice powder and 50 g of concentrated onion juice are added to the clear liquid for adjustment until 80 mg/100 mL Amadori Compounds, 30 mg/100 mL total flavonoids and 220 mg/100 mL proanthocyanidins are contained, the alcohol content is adjusted to be 6.5 g/100 mL, and fine filtration and filling are performed to obtain a finished product.

Sensory evaluation results: color is 4 points, clarity is 5 points, smell is 4 points, taste is 4 points, and total score is 16 points.

After storage for 24 months at room temperature, the retention rate of the Amadori Compounds, the total flavonoids and the anthocyanins in the product is 90% or higher.

Example 3

1,000 mL of fruit wine obtained by mixing dry white grape wine and blueberry wine according to a ratio of 3:1 is taken as a base material (of which alcohol content is 10.5 g/100 mL and anthocyanidin content is 25 mg/100 mL), 60 g of black garlic cut into 3 mm slices and 30 g of baked onion powder pulverized to 60 meshes are added, treatment is performed for 3 minutes by a 1000 rpm tissue masher, the mixture is stood in an environment of 8° C. for 4 hours, the residue is filtered and removed, then 10 g of tomato clear juice powder and 10 g of concentrated onion juice are added to the clear liquid for adjustment until 25 mg/100 mL Amadori Compounds, 38 mg/100 mL total flavonoids and 22 mg/100 mL proanthocyanidins are contained, the alcohol content is adjusted to be 9.5 g/100 mL, and fine filtration and filling are performed to obtain a finished product.

Sensory evaluation results: color is 5 points, clarity is 5 points, smell is 4 points, taste is 5 points, and total score is 19 points.

After storage for 24 months at room temperature, the retention rate of the Amadori Compounds, the total flavonoids and the anthocyanins in the product is 90% or higher.

Comparative Example 1 Adverse Effect of Use of Low-Concentration Fruit Wine for Multiple Leaching on Product Quality 1,000 mL of grape wine is taken as a base material (of which alcohol content is 8.5 g/100 mL and anthocyanidin content is 200 mg/100 mL), 100 g of black garlic cut into 3 mm slices and 100 g of baked onion powder pulverized to 60 meshes are added, treatment is performed for 3 minutes by a 1,000 rpm tissue masher, the mixture is stood in an environment of 4° C. for 8 hours, and the residue is filtered and removed; then 500 mL of grape wine is taken as the base material (of which the alcohol content is 8.5 g/100 mL and the anthocyanidin content is 200 mg/100 mL), the above filter residue is added, treatment is performed for 3 minutes by a 1,000 rpm tissue masher, then the mixture is stood in an environment of 4° C. for 8 hours, and filtration is performed; the two filtrates are mixed, and then 50 g of tomato clear juice powder and 50 g of concentrated onion juice are added to the clear liquid to obtain fruit wine concentrate which contains 15 mg/100 mL Amadori Compounds, 30 mg/100 mL total flavonoids and 220 mg/100 mL proanthocyanidins. It can be seen that if the high-concentration fruit wine in the leaching method provided by the present invention is substituted with the low-concentration fruit wine for multiple leaching, the content of Amadori Compounds in the obtained final product cannot meet the requirements.

Comparative Example 2 Effect of Alcohol Content in Aqueous Alcohol Solution for Leaching on Product Quality 100 mL of 50% aqueous alcohol solution is taken, 100 g of black garlic cut into 3 mm slices is added, treatment is performed for 3 minutes by a 1,000 rpm tissue masher, the mixture is stood in an environment of 4° C. for 8 hours, filtration is performed to obtain filtrate, vacuum concentration is performed to obtain black garlic extract, the black garlic extract is dissolved in 1,000 mL of grape wine, and 50 g of tomato clear juice powder and 50 g of concentrated onion juice are added to obtain a fruit wine product which contains 48 mg/100 mL Amadori Compounds, 30 mg/100 mL total flavonoids and 220 mg/100 mL proanthocyanidins. However, when extraction is performed with a high-concentration aqueous alcohol solution, the extraction of the Amadori Compounds is accompanied by full leaching of pigment ingredients, which makes the color of the fruit wine product slightly black and affects the appearance (color) of the product. The product has a sensory evaluation score of 11 points (color is 1 point, clarity is 4 points, smell is 3 points, taste is 3 points) and is not easy to accept for consumers.

Comparative Example 3 Effect of Alcohol Content of Low-Concentration Fruit Wine for Seasoning on Product Quality As in Example 1, if 1,000 mL of dry red grape wine is taken as a base material (of which alcohol content is 13.5 g/100 mL and anthocyanidin content is 112 mg/100 mL), 50 g of black garlic cut into 3 mm slices and 100 g of baked onion powder pulverized to 60 meshes are added, treatment is performed for 3 minutes by a 1,000 rpm tissue masher, the mixture is stood in an environment of 4° C. for 8 hours, the residue is filtered and removed, 30 g of tomato clear juice powder is added to the clear liquid to obtain fruit wine concentrate, and low-alcohol concentration fruit wine is not used for blending, the sensory indicator is 8 points (color is 1 point, clarity is 4 points, smell is 2 points, and taste is 1 points), and the quality of color, smell, taste and the like cannot meet the consumer demands.

Activity Test Results of Product Inhibiting Angiotensin-Converting Enzyme (ACE)

Instrument: Mindary full-automatic biochemical analyzer (BS-120 type)

Method: ordinary dry red grape wine (alcohol content is 13.5%), commercially available onion grape wine and the product of Example 1 are mixed with angiotensin converting enzyme kits (continuous monitoring method, Nanjing Jiancheng Bioengineering Research Institute, product sequence number E007) (according to a ratio of 1:8), after incubation at 37° C. for 180 seconds, zeroing by blank is performed, and the absorbance change is continuously monitored for 300 seconds at a dominant wavelength of 340 nm and a sub-wavelength of 450 nm by a rate method. The detection results are shown in Table 2.

TABLE 2

Concentration-inhibition rate relationship of different ketosamines (Amadori Compounds) ingredients on angiotensin-converting enzyme (ACE)

| Concentration (mg/mL) | Inhibition rate (%) | | | | |
|---|---|---|---|---|---|
| | 0.3040 | 0.0950 | 0.0475 | 0.0238 | 0.0119 |
| Ordinary dry red wine | 34.18 ± 2.68 | 29.85 ± 2.49 | 20.36 ± 3.21 | 9.25 ± 2.31 | 6.49 ± 1.96 |
| Onion grape wine | 48.45 ± 2.67 | 36.25 ± 2.44 | 21.32 ± 2.95 | 13.29 ± 2.13 | 5.96 ± 2.35 |
| Example 1 | 95.82 ± 4.38 | 81.50 ± 4.49 | 60.35 ± 2.63 | 31.86 ± 2.96 | 11.79 ± 2.33 |

What is claimed is:

1. A method for preparing a fruit wine product, which comprises:
   a) providing a base fruit wine comprising an alcohol content of 12 to 15 g/100 mL,
   b) leaching black garlic and baked onion into the base fruit wine thereby releasing one or more Amadori Compounds into the base fruit wine,
   c) mixing the base fruit wine from step b) with tomato clear juice powder and concentrated onion juice to obtain a fruit wine concentrate, and
   d) mixing the fruit wine concentrate with a fruit wine having an alcohol concentration lower than the base fruit wine of step a),
   wherein the fruit wine product obtained by these steps comprises:
   i) 5 to 15 g/100 mL alcohol,
   ii) 20 to 100 mg/100 mL of the Amadori Compounds, and
   iii) 30 to 50 mg/100 mL total flavonoids and/or 100 to 250 mg/100 mL of proanthocyanidins,
   wherein the fruit wine product is beneficial to cardiovascular system health,
   wherein the black garlic is prepared by heating fresh garlic at a temperature of 45 to 90° C. and a relative humidity of 50 to 95% for 30 to 90 days, and wherein the black garlic comprises Amadori Compounds at a concentration of 10 g/kg or higher, and
   wherein the baked onion is prepared by baking fresh onion at 180 to 300° C. for 10 to 30 min, and wherein the baked onion comprises Amadori Compounds at a concentration of 8 g/kg or higher.

2. The method for preparing the fruit wine product of claim 1, wherein the base fruit wine comprises a mixture of one or more of: grape wine, blueberry wine, chokeberry wine, bayberry wine, and Chinese wolfberry wine.

3. The method for preparing the fruit wine product of claim 2, wherein the base fruit wine comprises 100 to 250 mg/100 mL anthocyanidins.

4. The method for preparing the fruit wine product of claim 1, wherein the total flavonoid content of the concentrated onion juice is 1.5 g/kg or higher and the Amadori Compounds of the concentrated onion juice are at a concentration of 10 g/kg or higher.

5. The method for preparing the fruit wine product of claim 1, wherein the tomato clear juice powder is prepared by the steps of:
   providing tomatoes,
   crushing the tomatoes,
   hydrolyzing the tomatoes in pectin,
   filtering the tomatoes to yield a filtrate,
   heating the filtrate at moderate heat, and
   drying the heated filtrate to yield the tomato clear juice powder, and
   wherein the Amadori Compounds of the tomato clear juice powder are at a concentration of 10 g/kg or higher.

6. The method for preparing the fruit wine product of claim 1, further comprising the following steps:
   (a) providing the base fruit wine comprising an alcohol concentration of 12 to 15 g/100 mL,
   (b) leaching 5 to 10 g/100 mL of the black garlic and 3 to 10 g/100 mL of the baked onion into the base fruit wine for 3 minutes,
   (c) incubating the base fruit wine in an environment of 4 to 10° C. for 5 to 8 hours,
   (d) filtering and removing residue from the base fruit wine,
   (e) mixing the base fruit wine with 1 to 5 g/100 mL of the tomato clear juice powder and/or 1 to 5 g/100 mL of the onion juice concentrate to obtain the fruit wine concentrate, and
   (f) adjusting the alcohol content of the base fruit wine by adding the fruit wine having an alcohol concentration lower than the base fruit wine of step a) to achieve an alcohol content of 5 to 15 g/100 mL in the fruit wine product.

7. The method for preparing the fruit wine product of claim 1, wherein after mixing the fruit wine concentrate with the fruit wine having an alcohol concentration lower than the base fruit wine of step a), the method further comprises removing insoluble ingredients from the fruit wine product by fine filtration.

8. A method for preparing a fruit wine product, which comprises:
   a) providing a base fruit wine comprising an alcohol content of 12 to 15 g/100 mL,
   b) leaching black garlic and baked onion into the base fruit wine thereby releasing one or more Amadori Compounds into the base fruit wine,
   c) mixing the base fruit wine from step b) with tomato clear juice powder and concentrated onion juice to obtain a fruit wine concentrate, and
   d) mixing the fruit wine concentrate with a fruit wine to having an alcohol concentration that is lower than the base fruit wine of step a),
   wherein the fruit wine product obtained by these steps comprises
   i) 5 to 15 g/100 mL alcohol,
   ii) 20 to 100 mg/100 mL of the Amadori Compounds, and
   iii) 30 to 50 mg/100 mL of total flavonoids and/or 100 to 250 mg/100 mL of proanthocyanidins,
   wherein the fruit wine product is beneficial to cardiovascular system health,
   wherein the black garlic is prepared by heating fresh garlic at a temperature of 45 to 90° C. and a relative humidity of 50 to 95% for 30 to 90 days, wherein the black garlic is present in an amount of 5 to 10 g/100 mL, and wherein the black garlic comprises Amadori Compounds at a concentration of 10 g/kg or higher, and
   wherein the baked onion is prepared by baking fresh onion at 180 to 300° C. for 10 to 30 min and pulverizing the baked onion to a mesh size of 60 mesh, wherein the baked onion has a concentration of 3 to 10 g/100 mL in the fruit wine, and wherein the baked onion comprises Amadori Compounds at a concentration of 8 g/kg or higher.

9. The method for preparing the fruit wine product of claim 8, wherein the base fruit wine comprises a mixture of one or more of: grape wine, blueberry wine, chokeberry wine, bayberry wine, and Chinese wolfberry wine.

10. The method for preparing the fruit wine product of claim 9, wherein the base fruit wine comprises 100 to 250 mg/100 mL anthocyanidins.

* * * * *